United States Patent
Von Bulow et al.

(10) Patent No.: US 8,484,965 B2
(45) Date of Patent: Jul. 16, 2013

(54) APPARATUS FOR CONVERTING OCEAN WAVE ENERGY

(75) Inventors: Martin Von Bulow, Helsinore (DK); Kristian Glejbol, Glostrup (DK); Frank Daniel Mersebach, Hellerup (DK)

(73) Assignee: Wavepiston APS, Hensigor (DK)

( * ) Notice: Subject to any disclaimer, the term of this patent is extended or adjusted under 35 U.S.C. 154(b) by 314 days.

(21) Appl. No.: 13/119,487

(22) PCT Filed: Sep. 18, 2009

(86) PCT No.: PCT/DK2009/050244
§ 371 (c)(1),
(2), (4) Date: Apr. 20, 2011

(87) PCT Pub. No.: WO2010/031405
PCT Pub. Date: Mar. 25, 2010

(65) Prior Publication Data
US 2011/0204643 A1    Aug. 25, 2011

(30) Foreign Application Priority Data
Sep. 19, 2008    (DK) .................................. 2008 01311

(51) Int. Cl.
*F03B 13/00*        (2006.01)
(52) U.S. Cl.
USPC ............................................. 60/495; 290/53
(58) Field of Classification Search
USPC ....................................... 60/495, 500; 290/53
See application file for complete search history.

(56) References Cited

U.S. PATENT DOCUMENTS

| 870,706 | A | | 11/1907 | Woodard et al. |
| 875,950 | A | | 1/1908 | Reynolds et al. |
| 3,477,233 | A | * | 11/1969 | Andersen ......................... 405/79 |
| 4,098,084 | A | * | 7/1978 | Cockerell ........................ 60/500 |
| 4,392,349 | A | * | 7/1983 | Hagen .............................. 60/500 |
| 4,568,836 | A | * | 2/1986 | Reenberg ........................ 290/53 |
| 5,347,186 | A | | 9/1994 | Konotchick |
| 6,424,079 | B1 | * | 7/2002 | Carroll ........................... 310/339 |
| 6,476,511 | B1 | * | 11/2002 | Yemm et al. .................... 290/42 |
| 7,980,071 | B2 | * | 7/2011 | Farley et al. .................... 60/398 |
| 8,120,195 | B2 | * | 2/2012 | Pollack et al. .................. 290/53 |
| 2007/0257491 | A1 | | 11/2007 | Kornbluh et al. |
| 2011/0006532 | A1 | * | 1/2011 | Grey et al. ....................... 290/53 |
| 2011/0116925 | A1 | * | 5/2011 | Whitelaw .......................... 416/1 |
| 2011/0304144 | A1 | * | 12/2011 | Dehlsen et al. ................. 290/53 |
| 2013/0076039 | A1 | * | 3/2013 | Hagemann et al. ............. 290/53 |

FOREIGN PATENT DOCUMENTS

| EP | 1045138 A2 | 10/2000 |
| GB | 2012005 A | 7/1979 |
| WO | 96/02748 A1 | 2/1996 |
| WO | 98/17911 A1 | 4/1998 |
| WO | 2006/106184 A1 | 10/2006 |

OTHER PUBLICATIONS

Fascimile Transmittal of Apr. 15, 2013, Brad C. Spencer.*

* cited by examiner

*Primary Examiner* — Joseph Waks
(74) *Attorney, Agent, or Firm* — Pearne & Gordon LLP

(57) ABSTRACT

A device utilizing the horizontal component of wave motions for generating power. The device contains at least one oblong supporting structure and three or more independently movable resistance elements.

23 Claims, 5 Drawing Sheets

APPARATUS FOR CONVERTING OCEAN WAVE ENERGY

BACKGROUND OF THE INVENTION

1. Area of the Invention

This invention concerns a novel design of a device for the extraction of wave energy by means of which the mechanical energy contained in waves may be transformed into a usable form of energy.

More specifically, this invention relates to a device by which wave energy can be extracted by utilising the oscillating horizontal component of the wave motion at a series of points along a stationary, floating structure. Due to the special design of the device, the construction and initial costs will be low, hence it will be possible to extract the wave energy in an unprecedented cost-effective manner.

As a result of the low initial costs, the type of device mentioned here may even be used in near-shore areas and internal waters where the form and size of the waves would normally not allow for installation of commercially sustainable wave power generators.

An additional application of the device mentioned here would be as coast protection. As the device drains the kinetic energy from the waves, installations of this type of device will have a dampening effect on the waves when they reach the shore.

Another advantage of the device mentioned here is that it has little or no visible exposure in the environment in which it operates. The reason for this is that the device operates fully or partially submerged hence keeping its visual profile low.

Another advantage of the device mentioned here is that it comprises of small units that work independently, thus it is not functionally critical if some of these units become defective. The plant will still work—only with a slightly reduced effect even though there are defective units. These defective units may thus be repaired or replaced one at a time when this is timely.

2. Description of Prior Art

Over the years, numerous devices and methods have been suggested for the extraction of the kinetic or potential energy from waves and for the transformation of this energy into a usable form, either as mechanical energy, electrical energy or heat.

When watching a wave on a surface, it is easy to get the misconception that waves are columnar bodies of water oscillating at the vertical level without the existence of any horizontal motions.

If the wave motion is projected on a vertical level perpendicular to the propagation direction of the wave, it is, however, recognised that a wave motion is not a one-dimensional, but a two-dimensional motion. This may e.g. be recognised by observing the motion pattern of an element floating on a wavy water surface. If the motion of the floating element is recorded, it will become evident that it describes a circulating motion, perpendicular to the water surface and parallel to the propagation direction of the wave.

If the kinetic energy is measured from a wave at the vertical level perpendicular to the propagation direction of the wave, it is revealed that the mean kinetic energy in this level is equivalent to the potential energy of the waves as a result of the difference between the trough and crest of a wave.

Thus, in a wave motion there is a constant shift between kinetic and potential energy, very analogous to the shift between kinetic and potential energy that exists in the oscillating motion of a pendulum.

Literature describes a wide range of different wave power plant designs.

In literature, the most frequent plant type is equipped with tethered floats utilising the difference of height between the crest and trough of the waves. As an example of this plant type, U.S. Pat. No. 870,706 can be mentioned in which a number of floats move up and down, driven by the variations of the water surface level.

A mode of operation equivalent to the one mentioned above is applied in the European patent application EP 1045138A2 where the wave energy is used to pressurise a pipe from which a flow of pressurised water can be drawn off.

A method for direct extraction of electrical energy with a point-shaped buoy is presented in U.S. Pat. No. 5,347,186. This patent concerns the generation of electrical energy by means of a linear generator containing a movable magnet. If the generator is accelerated along the magnet's direction of motion, the magnet mentioned above will shift internally in the generator, which can be used to generate electrical energy. If one or more of this type of generators are placed on a buoy, these generators will continuously generate electrical energy qua the constant motion of the buoy. Even though this type of generators can easily be installed on existing buoys and function as power supply for these, this type of generators is not suitable for generating an electrical effect, which can recover the installation costs of the buoy.

A significant problem for all of the plants mentioned above is that their net generated power is low in relation to the initial costs. The low efficiency is due to the fact that these generators can only extract energy for an area corresponding to the area of the float. As the applied float is much smaller than a typical wavelength, there is thus a distinct limitation on the maximum theoretical output per float as the float only affects a small part of the wave area.

Even though wave power systems with vertically movable floats are intuitively easier to understand, literature also describes systems where the horizontal and not the vertical component of the wave's energy is utilised.

One of the earliest examples of this type of plant is found in U.S. Pat. No. 875,950 where a number of submerged resistance elements are forced back and forth as a result of the horizontal component in the circulating wave motion. The resistance elements according to U.S. Pat. No. 875,950 do not oscillate freely, as the motion is dampened by one or more pump units which force seawater under pressure into a collector pipe due to the forced motion of the resistance elements. This collector pipe is lead to a turbine station where the pressurised seawater is used to power a turbine.

A problem in connection with this principle described in U.S. Pat. No. 875,950 is that the resistance elements are hung up as vertically hinged doors. In practice, this means that only a small part of the resistance elements move with optimal speed in relation to the motive wave as the part close to the centre of rotation will move too slowly in relation to the horizontal motion of the wave, whereas the part of the resistance elements, which is farthest away from the hinge point, will move too fast in relation to the horizontal motion of the wave.

Another condition, which makes the device described in U.S. Pat. No. 875,950 unusable in practice, is that the horizontal component of the wave motion decreases with depth. Thus, the horizontal component of the wave motion will be all but extinct near the bottom where the resistance elements are located.

A similar, but more effective method for the application of the horizontal component of the waves is described in WO application 9817911. Unlike the procedure described in U.S.

Pat. No. 875,950, the resistance element is in this case anchored with hinges at the bottom of the sea, which implies that there is not much inconsistency between the motion of the wave and the motion of the resistance element. Furthermore, this invention has the advantage that it does not contain significant static elements which should stay put in relation to the relative motion of the water, this will reduce the stress of the water on the plant.

A common problem for the methods mentioned above for the utilisation of wave energy is that the initial costs are excessive relative to the installed power. This condition is due to the fact that existing methods for the utilisation of wave power are based on locally anchored point-shaped resistance elements. These local anchoring points must be severely over-dimensioned as they must be able to handle the force load on the structure during a storm.

As the construction and anchoring costs constitute a big part of the total initial costs, there is thus an approximate proportionality between the energy, which the system may potentially generate, and the initial costs for building the system.

INVENTION SUMMARY

The purpose of this invention is to present a device for utilisation of the horizontal component of oscillating wave motions in which a considerable reduction of the summed-up power load on the total device and by this a considerable reduction of the initial costs for the device are obtained.

This and other advantages are obtained by designing the device as an extended, floating structure, which will not be moved substantially by the horizontal, oscillating motion of the waves, and by mounting a number of resistance elements on this structure which by means of the effect of the waves will be forced to an oscillating motion, parallel to the extended, floating structure. By placing three or more of these resistance elements so that their mutual oscillating motion is out of phase with each other, the summed-up stress on the device is reduced.

In a preferred design, a device will be constructed large enough to span more than one wavelength. If a large number of resistance elements are mounted on this device, the summed-up oscillating load from all resistance elements will be much lower than the numeric sum of the single load of each of the resistance elements due to their mutual phase shift.

In a preferred design, the device is oriented in parallel to the propagation direction of the waves by means of one or several anchoring points.

In order to ease the construction and service of the device, it will be a great advantage to build it out of sub-elements, each of them with a length which is comparable to the mean distance between two resistance elements. In a preferred design, the device will therefore be constructed from a number of modules with a length that is shorter than the total length of the device.

A method for the utilisation of the energy to be extracted as a result of the forced motion of the resistance elements along the extended floating structure is by transferring the power to hydraulic pressure. This hydraulic pressure can either be transmitted in a closed hydraulic system or the hydraulic pressure can be built up by pumping seawater into one or several pipes, which are contained in the extended floating structure. In this way, central collection and extraction of energy from numerous resistance elements will be obtained.

In a preferred design, motion of the resistance elements in relation to the stationary structure results in the generation of hydraulic pressure from which usable energy can be extracted.

If the purpose of the floating structure is to extract electrical energy, it may in certain circumstances be advantageous to mount one part of a linear generator on the extended floating structure and another part of a linear generator on a resistance element. In this way, a motion of the resistance element relative to the extended structure will result in the generation of electrical energy.

In a preferred design, a motion of the resistance elements relative to the stationary structure will imply the generation of electrical energy.

DETAILED DESCRIPTION OF THE INVENTION

Despite the fact that a wave is progressive, the real motion of a random volume of water is an oscillation at the vertical as well as the horizontal plane. The purpose of this invention is to utilise the horizontal part of the oscillating wave motion to extract energy. Another purpose of this invention is to present a device for utilisation of the horizontal component of wave motions in which there is no proportionality between the number of resistance elements and the initial costs. Furthermore, the purpose of this invention is to present an anchoring method for this device which will ensure extremely low installation costs.

These and other additional advantages will be obtained by designing the device consisting of at least one oblong stationary structure on which a number of independently movable resistance elements are mounted. These resistance elements are characterised by the fact that, within a given length interval, they are able to move along the stationary structure. When affected by the horizontal component of a wave motion, these resistance elements are exposed to a relative movement in relation to the stationary structure. This relative movement between these two parts may be used to extract energy.

Figure 1:
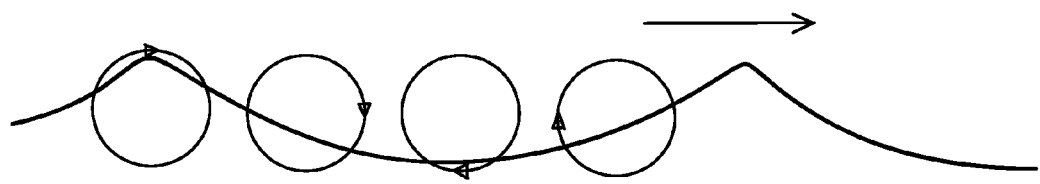
FIG. 1 Description of how a wave motion can be regarded as a superposition of a number of rotating motions.
Figure 2:
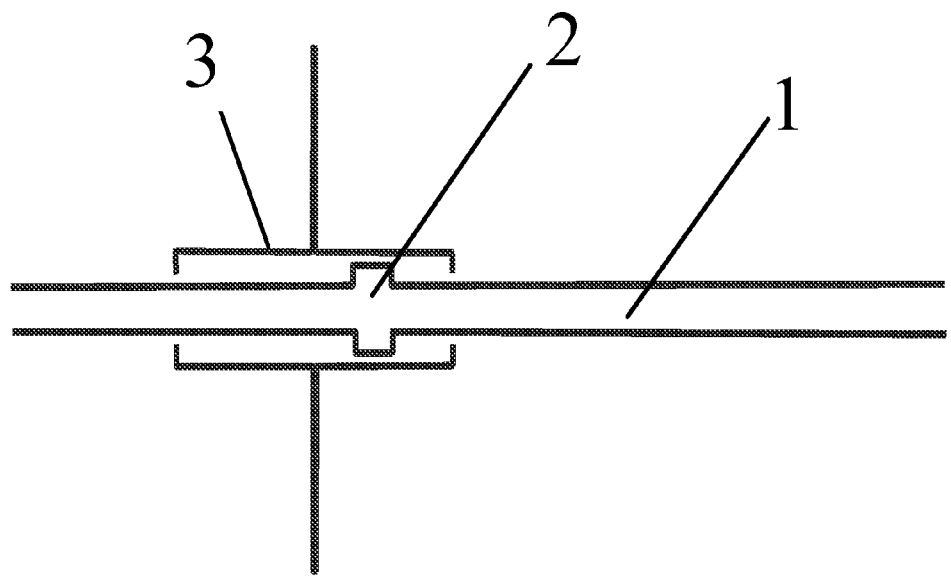
FIG. 2 Schematic drawing of a resistance element mounted on a stationary structure.
Figure 8:
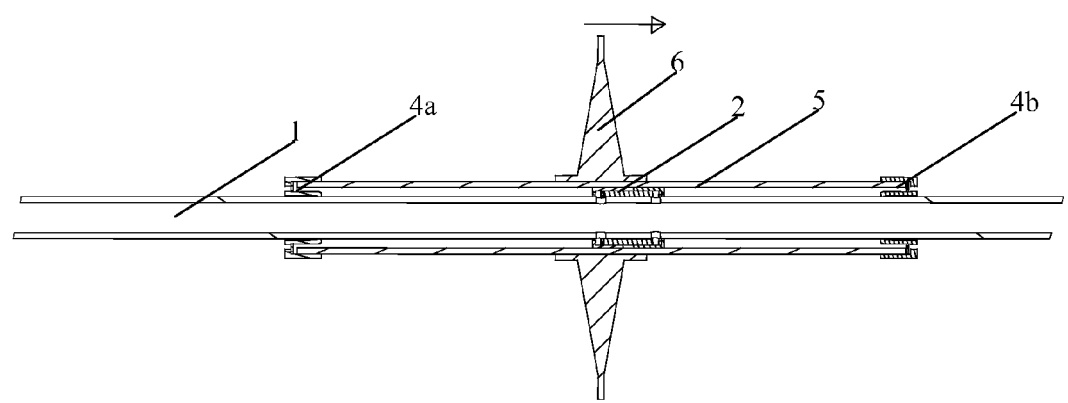

In FIG. 2, there is a schematic specification of a so-called resistance element mounted on a stationary structure (1). On the stationary structure (1), one or several obstacles (2) are mounted which will limit the free movement of the resistance element (3) parallel to the longitudinal axis of the stationary structure. In FIG. 8, it is also specified how an obstacle (2) together with an end stop (4a, 4b) limits the length over which the resistance elements (3) can travel. The location of the end stops in FIGS. 2 and 8 is exemplary and in no way exhaustive as other forms of limiting elements may be introduced according to the invention. In another, just as preferred, design, the travel of the resistance element (3) is restricted by two obstacles; i.e. one at each end of the travel of the resistance element. The allowed travel of the resistance element (3) can advantageously be selected so that this does not exceed a typical wavelength in the waters where the device is planned to be used.

Figure 3:
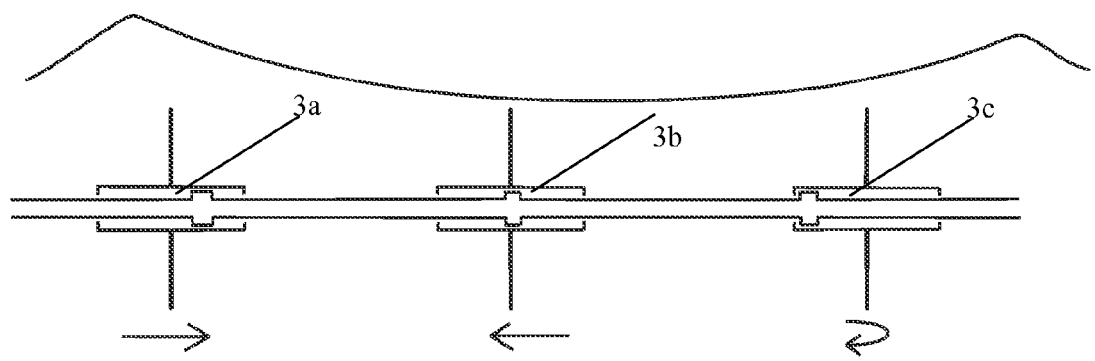
FIG. 3 Three resistance elements constructed on the same supporting structure.

A decisive advantage of wave power plants according to this invention is that not all resistance elements on the stationary structure are affected at the same time and in the same direction. FIG. 3 shows an imaginary example where three resistance elements (3a, 3b, 3c) are located on the same stationary structure (1). Under the three resistance elements (3a, 3b, 3c), an arrow indicates the direction in which the wave affects the three elements, provided that the propagation direction of the wave is from left to right. Note that the resulting force on the stationary structure will be lower than the summed-up numeric force of the single elements as one or more of the forces affecting the stationary structure (1) are contra-directional.

In practice, you will not place the resistance elements (3a, 3b, 3c) as close as in FIG. 3, but spread them across one or two wavelengths. The effect will be that the resulting net effect in the anchoring points will be lower than the summed-up numeric contribution from the individual resistance elements as the drive from the different resistance elements will equalize each other.

Figure 4:
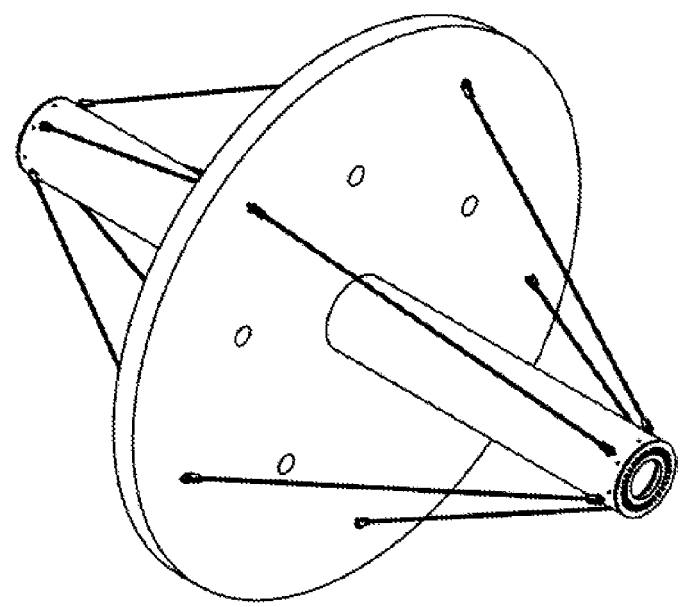
FIG. 4 Detailed design of resistance element. Note that the plate, which is mounted on the resistance element, is supported by a stay hence a very high degree of construction stiffness is obtained.
Figure 5:
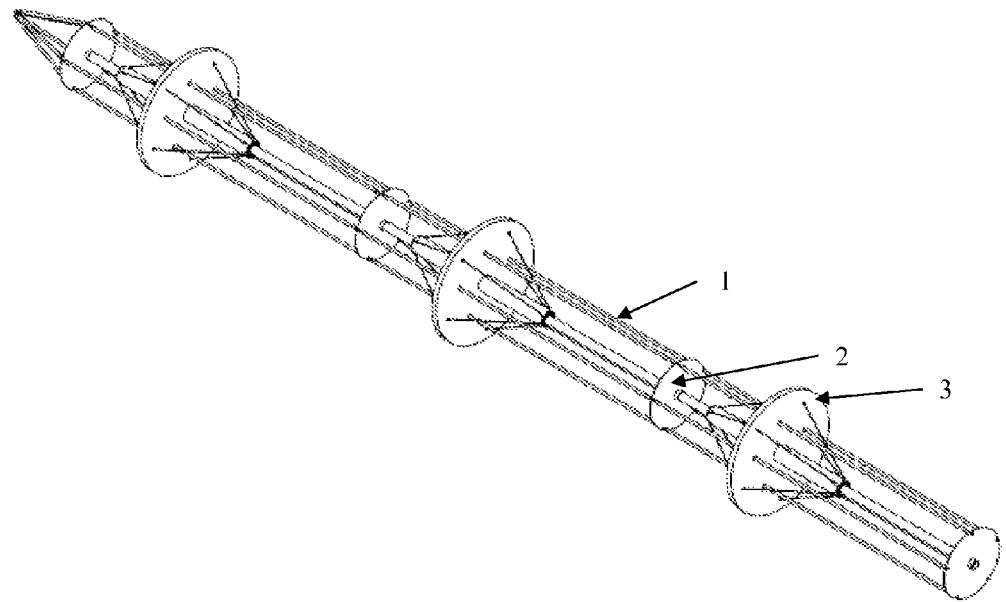
FIG. 5 One or several resistance element can be assembled in modules during final construction. The division of the assembled device in modules will facilitate the installation and maintenance.

FIGS. 4 and 5 shows a possible design of larger resistance elements in which the resulting forces and dimensions must be expected to be large. Thus, FIG. 4 shows how it is possible to increase the stiffness of a resistance element by mounting external pillars. FIG. 5 shows how the extended stationary structure can be imagined to be constructed by a series of smaller modules. The section in FIG. 5 has a length, which allows for mounting of 3 resistance elements. Note that the section in FIG. 5 is mounted with longitudinal stays (1) attached in maintaining plates (2). The purpose of these stays is to stiffen the construction and thus prevent torsion of this as a result of the effect of the resistance elements (3). In FIG. 5, it is also noted that the longitudinal stays at the far end of the construction are led to the same point, whereas the stays at the near end of the construction are closed on a maintaining plate. At the far end, the stays will transform their forces into an anchoring cable or another anchored element, whereas the stays at the near end can be connected to another module through the anchoring plate.

Figure 6:
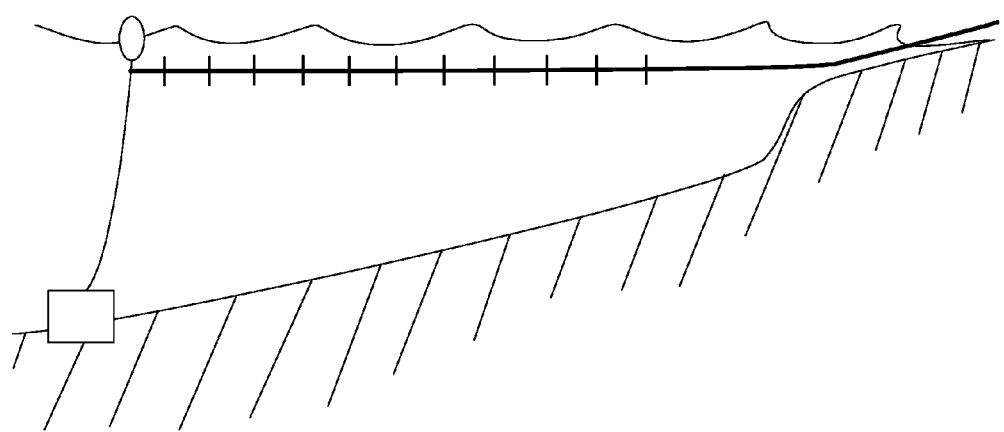
FIG. 6 System for the utilisation of wave energy in near-shore waters according to the invention.

Due to the equalizing effect of many resistance elements, which are affected in different directions, it will be possible to have only one or two anchoring points even for very long stationary structures. FIG. 6 shows a typical near-shore construction in which one end of the supporting string is anchored at two points, one point near the shore and the other point at a great distance from the shore. As only two anchoring points are required, the initial costs of this plant type are extremely low. Another advantage of this particular procedure is that the energy to be extracted from the device can be extracted on the shore, which will dramatically reduce the costs of continuous maintenance of the system.

Figure 7:
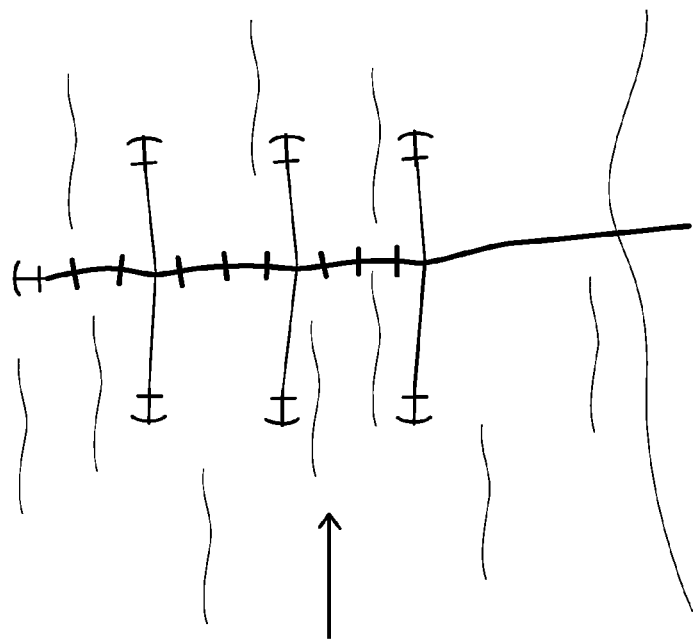
FIG. 7 System for the utilisation of wave energy in waters where the direction of the waves may vary significantly or where transverse forces must be gathered due to current FIG. 8 Detailed design of a possible mechanical solution which will result in generation of a hydraulic pressure where the resistance element is moved relatively to the stationary structure.

If a system is established in waters with varying wave directions or strong currents, it may be necessary to establish anchoring points along the stationary structure as shown in FIG. 7. Despite the fact that these anchoring points will increase the cost of the plant, the initial costs will not increase in proportion to the number of anchoring points as these additional anchoring points only require a relatively small amount of strength compared to the two main anchoring points at the ends.

FIG. 8 shows a cross section of a resistance element mounted on a stationary structure, which also functions as force transmitting element in a design where wave energy is transformed into hydraulic pressure. In this design, the stationary structure (1) is constructed as a reinforced pipeline, at the same time providing the opportunity to convey pressurised water into a turbine station. On the stationary structure (1), an obstacle (2) has been mounted, designed as a unidirectional valve, which only allows flow into the pipe that constitutes the stationary structure (1). On the stationary structure (1), a resistance element (3) is mounted, which mainly consists of a pipe-shaped body (5) with mounted end stops (4a, 4b) at the ends. These end stops also function as unidirectional valves, which only allow water to flow from the surrounding area to the ring-shaped volume defined by the exterior of the stationary structure (1) and the interior of the pipe-shaped body (5). If the stationary structure (1) is maintained, a shifting of the pipe-shaped body will now result in the generation of pressure in the part of the ring-shaped volume which is opposite to the direction of motion, whereas water is sucked into the part of the ring-shaped volume which is located in the direction of the motion. If the pipe-shaped body (5) is shifted relative to the stationary structure, water will be pumped from the surrounding area and into the internal volume, which is defined by the interior of the stationary structure.

In order to transmit the force from the surrounding waves to the pipe-shaped body (5), a fin (6) has been mounted on this.

To an expert it will be obvious that the above-mentioned hydraulic transmission method is one of many methods which can be used to store up energy from a wave according to the method mentioned above.

Another relevant method is the possibility of designing the pipe-shaped body (5) and the part of the stationary structure surrounding the pipe-shaped body so that these parts constitute a linear generator which will directly transform the motion of the pipe-shaped material into electrical energy.

Another method of interest could be to utilise the relative motion between the stationary structure and the resistance elements for the pumping of hydraulic fluids in a closed circuit.

Figure 9:
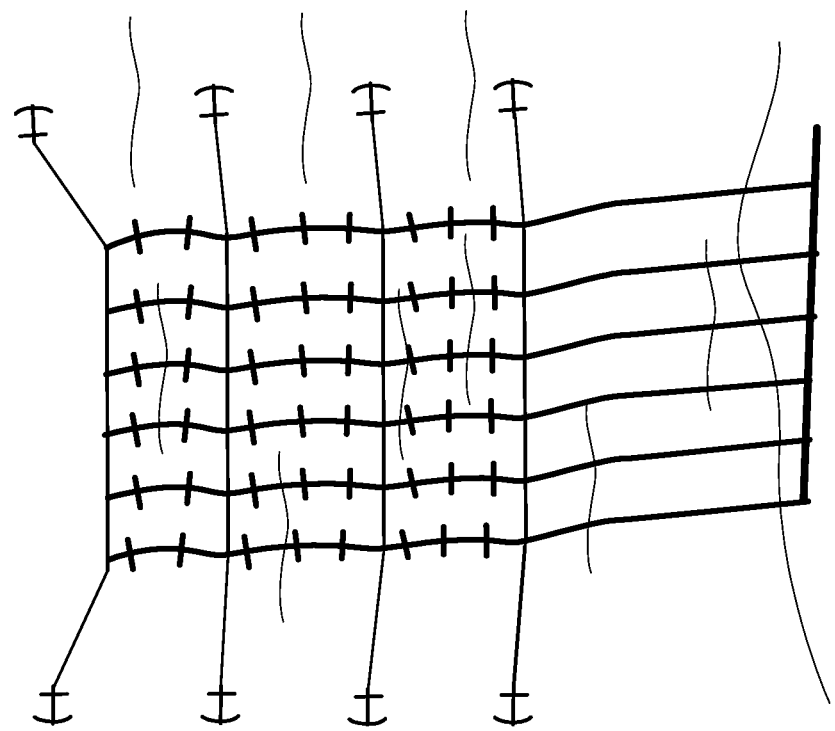
FIG. 9 A large number of devices stretched over a near-shore area.

As the individual device for extraction of wave energy is a string, it is quite simple to combine multiple strings in order to extract the energy of the waves over a large area. In FIG. 9, it is specified how 6 strings can be constructed as a blanket extracting wave energy over a large area. From FIG. 9, it clearly appears that it is possible to connect the strings at the ends, which may be a great advantage. For example, if the strings in FIG. 9 pump water towards the shore, a single turbine station will be able to handle energy from all the strings, which will additionally reduce the initial costs.

To an expert it will be obvious that the above-mentioned designs are exemplary and do thus not limit the scope of the invention. Thus, the scope of the invention shall consist of all imaginable modifications and equivalents which are covered by the spirit of the invention as described in the requirements mentioned below.

What is claimed is:

1. A long, floating apparatus for collection of a horizontal component of kinetic energy of oscillating water wave motions, the apparatus comprises at least one continuous stationary structure, and at least three resistance elements mounted on the stationary structure, such that they can move along the stationary structure and in this way collect energy, wherein each of the resistance elements is limited to move within a well-defined distance along the stationary structure, and wherein the continuous stationary structure has a length, and the at least three resistance elements are mounted on the stationary structure, such that they can move in parallel to the length of the stationary structure.

2. The floating apparatus according to claim 1, wherein the resistance elements can move individually from each other.

3. The floating apparatus according to claim 1, wherein the resistance elements are movably mounted to the stationary structure, such that they, when being subjected to oscillating waves, can move in oscillating motion parallel to the stationary structure.

4. The floating apparatus according to claim 3, wherein the resistance elements can move in oscillating motion parallel to the stationary structure without simultaneously subjecting the stationary structure to substantial movements by the horizontal components of the waves.

5. The floating apparatus according to claim 1, wherein the apparatus comprises one or several anchoring points for ensuring the location of the apparatus in relation to the waves.

6. The floating apparatus according to claim 1, wherein the continuous stationary structure is constructed from a series of connectable sub-elements.

7. The floating apparatus according to claim 1, wherein the continuous stationary structure contains a ring-shaped volume.

8. The floating apparatus according to claim 1, wherein the motion of one or several resistance elements relative to the stationary structure is arranged to pump pressurized water into the ring-shaped volume, when the apparatus is applied in an ocean, fully or partly submerged.

9. The floating apparatus for according to claim 1, wherein the apparatus is constructed such that motion of the resistance elements relative to the stationary structure is utilized for pressurizing of a hydraulic fluid in a closed system when the apparatus is applied in an ocean.

10. The floating apparatus according to claim 1, wherein the apparatus comprises a linear generator for each resistance element, one part of the generator for each resistance element is mounted to the stationary structure and another part of the generator is mounted to the resistant element.

11. The floating apparatus according to claim 10, wherein the linear generator for each resistance element is arranged such that a motion of the resistance element relative to the stationary structure will result in generation of electrical energy.

12. The floating apparatus according to claim 1, wherein one or several elements of the stationary structure comprises equipment which can transform changes in magnetic flux to electrical energy.

13. The floating apparatus according to claim 12, wherein one or several resistance elements of the stationary structure comprises magnets.

14. The floating apparatus according to claim 1, wherein the stationary structure comprises several obstacles which limit free movement of the resistance elements parallel to a longitudinal axis of the stationary structure.

15. The floating apparatus according to claim 14, wherein the resistance elements comprises endstops which together with the obstacles limits the length over which the resistance elements can travel.

16. A method of collection of a horizontal component of kinetic energy of waves in oscillating water wave motions the method comprises
providing an apparatus comprising at least one continuous stationary structure having a length and at least three resistance elements mounted on the stationary structure which can move in parallel to the stationary structure and in this way transmit usable energy to this, each of the resistance elements is limited to move within a well-defined distance along the stationary structure, and wherein the at least three resistance elements are mounted on the stationary structure, such that they can move in parallel to the length of the stationary structure and
placing the apparatus in an ocean such that it is floating and arranging the stationary structure predominantly in parallel to a propagation direction of the waves.

17. The method according to claim 16, wherein the shortest distance between the two farthest resistance elements is larger than half a mean wavelength in the waters in which the device is localized.

18. The method according to claim 16, wherein the location of the device in relation to the waves is ensured by means of one or several anchoring points.

19. The method according to claim 16, wherein each of the resistance elements are forced to an oscillating motion parallel to the stationary structure, such that their mutual oscillation motion is out of phase with each other.

20. The method according to claim 16, wherein the motion of the resistance elements relative to the stationary structure results in the generation of hydraulic pressure from which energy can be extracted.

21. The method according to claim 16, wherein the motion of the resistance elements relative to the stationary structure is utilized for pressurizing of a hydraulic fluid in a closed system.

22. The method according to claim 16, wherein the method comprises exclusively utilization of the horizontal component of wave motions, wherein the resistance elements, independently of each other are moving along the length of the stationary structure when affected by the horizontal component of wave motions whereby energy is extracted.

23. The method according to claim 16, wherein the apparatus operates fully or partly submerged.

* * * * *

UNITED STATES PATENT AND TRADEMARK OFFICE
CERTIFICATE OF CORRECTION

PATENT NO.        : 8,484,965 B2                                                          Page 1 of 1
APPLICATION NO.   : 13/119487
DATED             : July 16, 2013
INVENTOR(S)       : Von Bulow et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 344 days.

Signed and Sealed this

Eighth Day of September, 2015

Michelle K. Lee
*Director of the United States Patent and Trademark Office*